May 29, 1951   R. B. J. BRUNN   2,554,893
TRAFFIC SIGNALING SYSTEM
Filed July 31, 1946   2 Sheets-Sheet 1
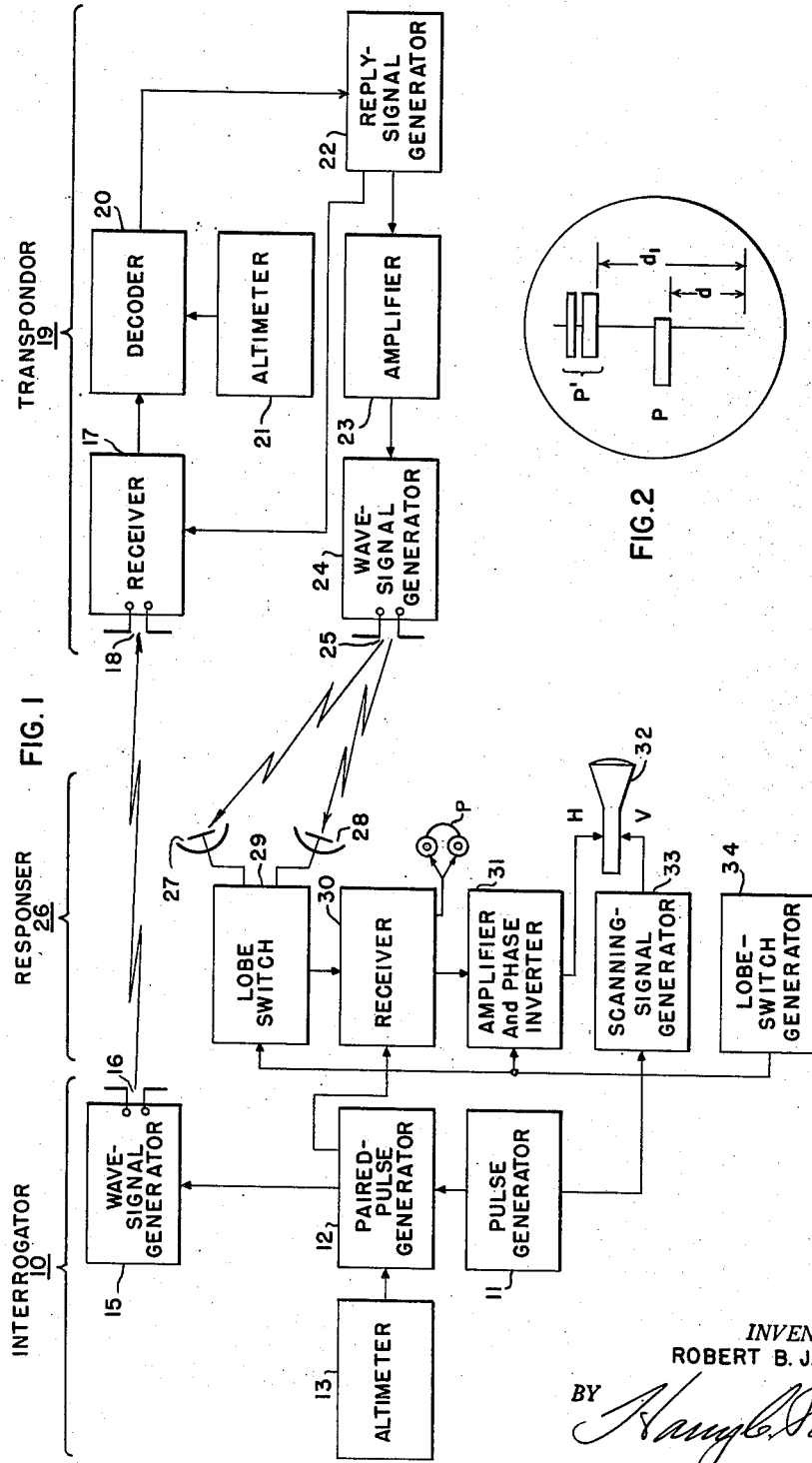
INVENTOR.
ROBERT B. J. BRUNN
BY
ATTORNEY

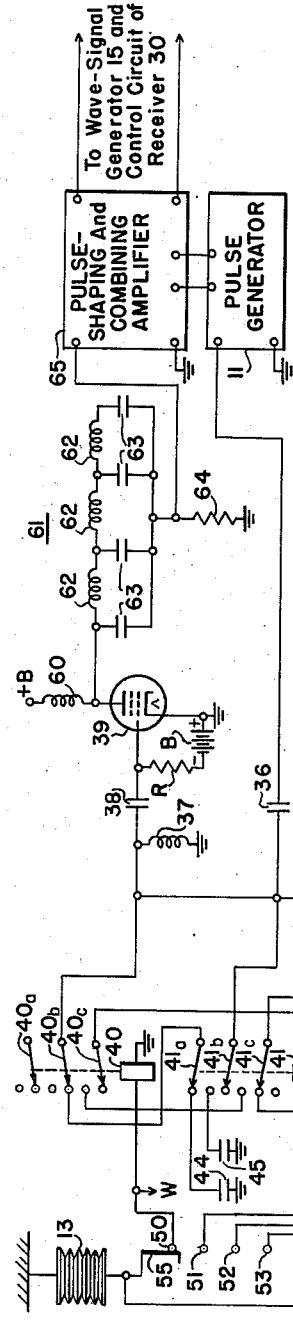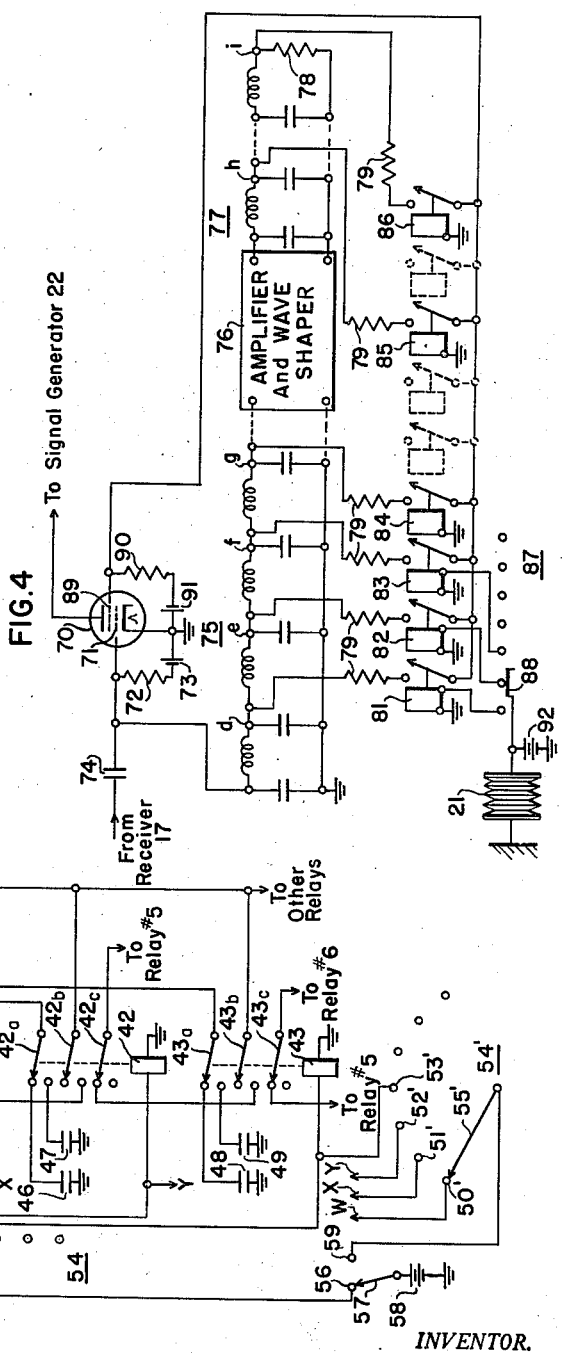

Patented May 29, 1951

2,554,893

UNITED STATES PATENT OFFICE 2,554,893

TRAFFIC SIGNALING SYSTEM

Robert B. J. Brunn, Manhasset, N. Y., assignor to Hazeltine Research, Inc., Chicago, Ill., a corporation of Illinois Application July 31, 1946, Serial No. 687,422

17 Claims. (Cl. 250—8)

1

The present invention relates to traffic signaling systems and, particularly, to such systems for traffic signaling between two mobile objects using any of a plurality of identified traffic zones available to mobile objects. While the invention is of general application, it is particularly suitable for use as an anti-collision aircraft warning system and will be described in that connection.

The system of aircraft traffic control presently used involves the altitude separation of aircraft in cross-country flight and when "stacked" at an airport with other aircraft awaiting permission to land. In cross-country flight, several aircraft may be permitted to fly at the same altitude level if traveling in thes same direction and adequately spaced by their relative departure schedules. Every such flight schedule must be approved as to time of departure, time of arrival and altitude of flight en route in order that a hazardous condition shall not occur by any aircraft crossing or merging into the path of flight of another under conditions conducive of a collision. Each flight schedule is individually considered for approval by a traffic control dispatcher and each flight altitude is individually established by numerous governing factors. This system of aircraft traffic control has numerous well-known disadvantages and limitations.

In a copending application of Knox McIlwain, Serial No. 617,020, filed September 18, 1945, entitled "Wave-Signal Communication System," now abandoned, and assigned to the same assignee as the present application, there is disclosed a traffic control system which avoids many of the disadvantages and limitations of the system last described. This new system is one based upon a division of the air space into vertically separated traffic zones and operates to provide to a pilot using any of such zones an indication of the direction and distance from his aircraft of any other aircraft using the same traffic zone. Each pilot is thus warned of the presence of all other aircraft operating in his vicinity and at his altitude. This enables a pilot at all times so to maneuver his aircraft as to avoid any hazardous flight condition. These indications are automatically provided in accordance with altitude strata and provision is made for a pilot manually to explore the traffic conditions prevailing at any other altitude strata above or below his own strata.

Certain simplifications of the system apparatus and increased ease of system operation are effected in the system last described when the altitude-separated traffic zones have discrete and relatively fixed zone boundaries, as when the

2 traffic zones are established by one-thousand foot intervals from sea level to the highest altitude used by any aircraft subject to traffic control. When the system is operated in this manner, indications furnished to a pilot using a given traffic zone involve only the presence of those aircraft in his vicinity which are within the altitude boundaries of his given zone. It would be desirable, however, that a pilot also be automatically furnished with information concerning the presence and location of any aircraft using a traffic zone contiguous to his own zone but in the process of changing altitude from such other zone to his own zone. This additional indication seasonably given will enable the pilot to avoid a hazardous flight condition much as though the other aircraft were actually in the zone then used by the pilot. Likewise, it would be desirable that indications be automatically furnished a pilot of all aircraft in a contiguous traffic zone where the pilot is using a given zone but is maneuvering to enter the contiguous zone.

It is an object of the present invention, therefore, to provide a new and improved system, for signaling between two mobile objects using any of a plurality of identified traffic zones available to mobile objects, which is suitable for use in a traffic control system of the type last described and which possesses the desirable features last mentioned.

It is a further object of the invention to provide a traffic signaling system particularly suitable for aircraft traffic control and one which permits the establishment of relatively fixed vertically separated traffic zones without at the same time creating hazardous flight conditions as between aircraft moving from one such zone into another.

It is an additional object of the invention to provide a traffic signaling system, useful in an aircraft traffic control system employing relatively fixed vertically separated traffic zones, in which ample warning is automatically given each aircraft operating in a given zone of the presence and location of all nearby aircraft operating in the given zone and ample warning is simultaneously and automatically given of all nearby aircraft operating in a zone contiguous to the given zone but moving toward the given zone for eventual entry thereinto.

In accordance with one form of the invention, a system for signaling between two wave-signal stations at least one of which is carried by a mobile object using any of a plurality of relatively fixed and identified traffic zones available to mobile objects comprises: means at one of the stations for transmitting a wave signal modulated by a signal having a characteristic identifying by the variation thereof a selectable one of the traffic zones; means at the other of the stations for receiving the wave signal and for translating and utilizing a signal derived in response thereto for determining correspondence between a characteristic of said derived signal and the characteristic of the signal of a traffic zone to which the receiving means is selectably responsive; and means included in the station carried by the object for causing the aforesaid one of the means at the last-mentioned station automatically and additionally to effect translation and utilization of the derived signal by the receiving means for determining contiguity between a selectable zone of said first-named means and said traffic zone of said second-named means as the object is in the vicinity of the boundary between the last-mentioned zones.

In accordance with a particular form of the invention, a system for signaling between two mobile objects, using any of a plurality of identified traffic zones available to mobile objects, comprises: means carried by one of the objects for transmitting wave-signal energy modulated by signal energy of pulse wave form having at least two relatively variable wave-form portions normally identifying by their relative amount of variation the one of the traffic zones used by such one object but adapted by selective actuation of this means additionally and simultaneously to identify a traffic zone contiguous to the one zone. The system includes means carried by the other of the objects for receiving the wave-signal energy and for translating and utilizing signal energy derived in response thereto for determining correspondence between the relative amounts of variation of the variable wave-form portions of said derived signal energy and the characteristic variation by the wave form of the traffic zone then used by such other object, whereby translation and utilization of the derived signal energy occurs during intervals when the other object is using any traffic zone identified by the aforesaid modulation signal.

For a better understanding of the present invention, together with other and further objects thereof, reference is had to the following description taken in connection with the accompanying drawings, and its scope will be pointed out in the appended claims.

Referring now to the drawings, Fig. 1 is a schematic circuit diagram representing a signaling system embodying the present invention in a particular form; Fig. 2 illustrates a representative indication provided by the Fig. 1 system; Fig. 3 is a circuit diagram, partly schematic, representing a suitable circuit arrangement of a paired-pulse generator utilized in the Fig. 1 system; and Fig. 4 is a circuit diagram, partly schematic, representing a suitable circuit arrangement for a decoder unit utilized in the Fig. 1 system.

Referring now more particularly to Fig. 1 of the drawings, there is represented a complete system for signalling or communication between two wave-signal stations at least one of which is carried by a mobile object using any of a plurality of relatively fixed identified traffic zones available to mobile objects. While as earlier mentioned the invention is of general utility, it has particular utility in aircraft traffic-control systems having vertically separated traffic zones and will be described in that connection. For this purpose, the mobile object mentioned is then an aircraft and the vertically separated traffic zones have relatively fixed altitude boundaries preferably established with relation to sea level. The first such zone may extend from sea level to one-thousand feet, for example, the second from one-thousand feet to two-thousand feet, and higher altitude zones may have similar one-thousand foot boundary separations or other discrete separations as desired up to the highest useful zone. In the particular communication system hereinafter described, communication between a plurality of pairs of aircraft each carrying one of the wave-signal stations is effected upon the same wave-signal frequency, but the transmitted wave signals are modulated by a pulse-modulation signal having repeated pairs of pulses with the spacing between the pulses of each pair varying with the altitude zone then used by the transmitting aircraft. The transmitted wave signal is thus coded as to altitude. A receiver carried by another aircraft receives all transmitted wave signals without regard to their altitude coding, but utilizes only the modulation components of those received wave signals which have an altitude coding corresponding to that then in use by the second aircraft. The received wave signal is thus decoded as to altitude. Such altitude coding and decoding normally are accomplished automatically by a barometer or other altitude-responsive device associated with and controlling the operation of both the transmitter and the receiver.

This system of communication enables a warning indication to be furnished each aircraft of the distance, direction, and possibly the direction of flight of all other aircraft flying in the same altitude zone. Upon movement of an aircraft to the vicinity of the upper or lower boundaries of its altitude zone, provision is also made for automatically furnishing indications of similar scope relative to all aircraft in the next higher or next lower altitude zone. Such warning indications are useful to avoid collisions between aircraft flying at the same altitude. Thus a communication system is provided by which each pilot may assume full responsibility for the navigation of his airplane along a prescribed course at a preselected altitude yet may do so without danger of collision with other aircraft flying at the same altitude even though all aircraft are flying under conditions of extremely poor visibility.

Unforeseen circumstances occurring during flight may require that a pilot leave his preselected altitude zone for another. The communication system of the present invention permits this change of zone with complete safety to all aircraft and without regard to the visibility conditions prevailing. Where such change of zone becomes necessary or desirable, circumstances may permit the choice by the pilot of a traffic zone either near or more remotely situated from his then used zone and either above or below the latter. Flexibility of communication is enhanced in this type of situation by the provision of a manual control temporarily to enable the pilot manually to change the operation of his transmitter from the automatic-altitude coded type of transmission to a manually selectable altitude-coded type of transmission. This enables him to explore the traffic situation in his vicinity and at any altitude whatsoever. Such exploration may be desirable, for example, should a pilot feel that the traffic in his own altitude zone has become too dense for adequate safety and thus desire to investigate the density of traffic in one or more altitude zones immediately above or immediately below him. This investigation and any ensuing change of elevation into a selected altitude zone may be accomplished without creating any hazardous flight condition.

As earlier mentioned, the communication system of the present invention is adapted to provide communication between two wave-signal stations at least one of which is carried by a mobile object using any of a plurality of relatively fixed identified traffic zones available to mobile objects. The system includes means at one of the stations for transmitting a wave signal modulated by a signal having a characteristic identifying by the variation thereof a selectable one of the traffic zones. In particular, this means may be carried by an aircraft and the modulation signal preferably is of pulse wave form having at least two relatively variable wave-form portions normally identifying by their relative amount of variation the one of the traffic zones used by such aircraft, but adapted additionally and simultaneously to identify a traffic zone contiguous to the one zone. This additional identification of the contiguous traffic zone may be either manually or automatically provided when the aircraft moves to a position in the vicinity of the boundary between the one zone and the contiguous zone. The wave form of the modulation-signal energy preferably is of the repeated-pulse wave-form type with grouped pairs of pulses of which the relatively variable wave-form portions thereof previously mentioned comprise the leading edges of each such pair. The relative spacing between the leading edges of each pair of pulses then designates an individual one of the plurality of traffic zones. This wave form of the modulation signal will hereinafter be referred to for convenience as a "paired pulse" wave form.

For the traffic control of aircraft, the traffic zones last mentioned are altitude separated from a reference traffic zone level which, as earlier mentioned, may be at sea level. For such applications, the transmitting means first mentioned may include means for providing a control action varying automatically with vertical distance from a traffic-zone reference level and means controlled by such a control action for so controlling the relatively variable wave-form portions of the modulation-signal energy as automatically to identify the traffic zone used by the one object. The means for providing the control action may comprise, for example, a barometer or for certain applications a radio altimeter, a barometer providing a control action varying with barometric pressure and thus with altitude. In a preferred form of the invention, the barometer or like device varies the pulse spacing between the paired pulses of the modulation-signal energy.

The transmitting means above described will for convenience hereinafter be designated an "interrogator," since its function is to transmit an altitude-coded interrogating wave signal, and is represented in Fig. 1 by the interrogator 10. The interrogator 10 includes a generator 11 for generating a signal of pulse-wave form and of constant periodicity which may, for example, be anywhere from sixty to two-thousand pulses per second. An output circuit of the pulse generator 11 is coupled to an input circuit of a paired-pulse generator 12, the detailed arrangement and operation of which will be more fully considered hereinafter, which is controlled in operation by an altimeter 13. The output circuit of the generator 12 is coupled to a modulation input circuit of a wave-signal generator 15. The output circuit of the generator 15 is coupled to an antenna system 16 for radiation of the modulated wave signal.

The communication system also includes means for receiving the wave-signal energy transmitted by the first object and for translating and utilizing a signal derived in response thereto when the characteristic thereof corresponds to the identification of a traffic zone to which the receiving means is selectively responsive. In particular, the derived signal is translated and utilized when the variable waveform portions of the derived signal energy have a relative amount of variation corresponding to the identification of the traffic zone when used by an aircraft which carries the receiving means. Thus, translation and utilization of the derived signal energy occur during intervals when the aircraft is using any traffic zone identified by the modulation-signal energy of the wave-signal transmission. In one form of the invention, the derived signal energy has a wave form corresponding to that of the modulation-signal energy and including the two variable wave-form portions thereof, for example a paired-pulse wave form in which the leading edges of two successive pulses thereof have a spacing varying in correspondence with that of the modulation signal. This receiving means comprises the receiver 17 which has an input circuit coupled to an antenna 18 and which forms one unit of a transpondor 19.

The transpondor 19 includes means for translating the signal energy derived by the receiver 17 when the variable wave-form portions thereof have a relative amount of variation corresponding to the identification of the traffic zone then used by the object which carries the transpondor. There is also included means for selectively controlling the last-mentioned means additionally and simultaneously to effect the translation and utilization thereby of the signal energy derived by the receiver 17 when the amount of variation of the variable wave-form portions thereof corresponds to a traffic zone contiguous to the then used traffic zone last mentioned. This additional translation of the derived signal energy is preferably accomplished automatically in response to the movement of such other object to a position in the vicinity of the boundary between the then used traffic zone and a traffic zone contiguous thereto. The means last mentioned comprises a decoder unit 20, the arrangement and operation of which will be more fully considered hereinafter, having an input circuit coupled to an output circuit of the receiver 17 and having an operation controlled by an altimeter 21. Signal energy translated by the decoder 20 is utilized by a reply-signal generator 22. The latter has an input circuit coupled to the output circuit of the decoder 20 and has an output circuit coupled to an input circuit of an amplifier 23 and to a gain-control circuit of the receiver 17. The output circuit of the amplifier 23 is coupled to a modulation-input circuit of a wave-signal generator 24 to modulate the wave signal generated therein. The output circuit of the generator 24 is coupled to an antenna system 25. Essentially the units 22, 23 and 24 comprise a transmitter included in the transpondor 19 for transmitting a modulated wave-signal reply which may in some cases be coded for identification or communication purposes.

The communication system also includes, at the object which carries the interrogator 10, a receiver 26 for receiving the reply wave signal transmitted by the transpondor 19 and for deriving and utilizing the modulation components thereof to provide an indication which may simply be an indication that a reply has been received, as when the output of this receiver is applied to a pair of headphones, or an indication of the distance between the two objects and the direction of the second object from the first. This receiver, hereinafter designated for convenience as a "responser," is shown as of a type for providing an indication of the distance and direction of the transpondor 19 from the interrogator 10 and responser 26. For this purpose, the responser 26 includes a pair of directive antenna systems 27, 28 having slightly overlapping directional characteristics in a horizontal plane but little directivity in a vertical plane. These antenna systems are coupled to individual input circuits of a lobe switch 29 having a common output circuit coupled to an input circuit of a receiver 30. The modulation signal developed in the output circuit of the unit 12 is applied to a gain control circuit of the receiver 30 for a purpose presently to be explained. The output circuit of the receiver 30 is coupled through an amplifier and phase inverter 31 to a pair of horizontal deflecting electrodes, designated as H, provided in a cathode-ray tube 32. The output circuit of the receiver 30 may also be coupled to a pair of earphones P, if desired, to provide an audible indication that one or more reply wave signals are being received. The responser 26 also includes a scanning-signal generator 33 having an output circuit coupled to a pair of vertical deflecting electrodes, designated as V, provided in the cathode-ray tube 32. A synchronizing-signal circuit of the generator 33 is coupled to an output circuit of the generator 11 to be synchronized in operation by the pulse signal generated by the latter. The responser 26 also includes a lobe-switch generator 34 having an output circuit coupled to a control circuit of the lobe switch 29 and to a phase-control circuit of unit 31.

Considering now the operation of the communication system just described, the pulse generator 11 generates a signal of periodic-pulse wave form and applies the signal to the paired-pulse generator 12. The detailed operation of the latter will be considered hereinafter, but it may be stated for purposes of the present description that the generator 12 is responsive to each pulse applied thereto from the generator 11 to generate a signal of paired-pulse wave form, the spacing between the leading edges of each such pair of pulses varying with the control action provided by the altimeter 13. This pulse spacing thus automatically designates the altitude traffic zone then used by the aircraft which carries the interrogator 10 and responser 26. Provision is made in the units 12 and 13, however, for automatically providing in addition, and simultaneously with the other identification mentioned, an identification of a traffic zone contiguous to the one zone upon movement of the aircraft to the vicinity of the boundary between the one and contiguous zones. Provision is also made in the unit 12 manually to establish a paired-pulse spacing corresponding to that of any other altitude zone to which interrogation is desired. The paired-pulse signal generated by generator 12 is applied to a modulation input circuit of the wave-signal generator 15 to modulate the wave signal generated by the latter. The modulated wave signal is radiated by the antenna system 16.

The transmitted wave signal of the interrogator 10 is received by the receiver 17 of the transpondor 19 carried by another aircraft. The pulse-modulation components of the received wave signal are derived by the receiver and are applied with positive polarity to the input circuit of the decoder 20. The operation of the decoder 20 will be considered in detail hereinafter, but for purposes of the present description it may be stated that the derived modulation signal applied to its input circuit is translated when the paired pulses thereof have a spacing corresponding to the identification of the traffic zone then used by the aircraft which carries the transpondor 19. Translation by the decoder 20 of the modulation signal derived by the receiver 17 thus occurs during intervals when the aircraft which carries the transpondor 19 is using any traffic zone identified by the modulation signal of the received wave signal. This decoding operation of unit 20 is under control of the altimeter 21. The control is such, however, that upon movement of the aircraft which carries the transpondor 19 to the vicinity of the boundary between the traffic zone then used by the aircraft and a contiguous traffic zone, the decoder 20 also translates the derived modulation signal when the spacing between the paired pulses thereof corresponds to the identification of the contiguous zone. The signal translated by the decoder 20 is applied to the reply-signal generator 22 and each pulse of the applied signal initiates the generation of a corresponding pulse or group of pulses of a reply signal generated by the latter unit. The particular wave form of the reply signal, for example the number, durations and spacings of grouped pulses thereof, adequately identify the aircraft which carries the transpondor 19, the speed of the aircraft, its bearing, and the like. This reply signal is applied through the amplifier 23 to the modulation input circuit of the wave-signal generator 24 to modulate the wave signal generated by the latter. The modulated wave signal is radiated by the antenna 25 as a reply-modulated wave signal. The reply signal of generator 22 is also applied to a gain-control circuit of the receiver 17 to de-energize the latter during the moment of radiation of each pulse from the antenna 25, thus to ensure that the transpondor 19 shall not reply to its own transmissions.

It is thus apparent that the transpondor 19 replies only to those received wave signals which have modulation components corresponding to the traffic zone then used by the aircraft carrying the transpondor or corresponding to a traffic zone contiguous thereto. The reply to a contiguous traffic zone may be due to the approach of an interrogating aircraft to a zone then used by the replying aircraft or due to the approach of the replying aircraft toward the boundary of a zone then in use by an interrogating aircraft. While the receiver 17 may receive and derive the modulation components of wave signals transmitted by aircraft in altitude zones other than those last mentioned, the derived modulation components are not translated by the decoder 20 since the spacing between the paired pulses of any such derived signal is not that for which the decoder 20 is automatically set by the altimeter 21. No reply is thus made by the transpondor 19 to such received wave signals.

The reply wave signal of the transpondor 19 is received by the antenna systems 27 and 28 of the responser 26. The lobe-switch generator 34 generates a signal which so controls the switch 29 that the antenna systems 27 and 28 are alternately connected to the input circuit of the receiver 30. Since the antenna systems 27 and 28 are directive, the intensity of the wave signal received by the antenna 27 is the same as that received by the antenna 28 only when the transpondor 19 is carried by a craft which is positioned directly ahead of the antenna systems 27 and 28. The antenna systems 27 and 28 also receive, of course, at least a small quantity of the transmitted wave-signal energy directly coupled thereto from the antenna 16 of the interrogator 10. While this energy is likewise applied through the lobe switch 29 to the receiver 30, there is applied at the same time to a gain-control circuit of the receiver the paired-pulse signal developed in the output circuit of the paired-pulse generator 12. This signal so controls the gain of the receiver 30 that the latter does not translate the wave-signal energy directly received from the antenna 16, thereby preventing possible paralysis of the receiver by the directly received energy of the interrogator.

The receiver 30 derives the modulation components of the wave signal received from the transpondor 19 and applies such components through the amplifier and phase inverter 31 to the horizontal deflecting electrode H of the cathode-ray tube 32. The signal generated by the lobe-switch generator 34 so controls unit 31 that these modulation components are applied to the tube 32 alternately with direct phase and inverted phase in synchronism with the alternate connection of the antenna systems 27 and 28 to the receiver 30. Consequently, one phase of the modulation signal applied to tube 32 corresponds to reception by the antenna system 27 while the inverted phase of the applied modulation signal corresponds to reception by the antenna system 28. By rotating the antenna systems 27 and 28 until the modulation components of direct and inverted phases have equal amplitudes, the azimuth of the replying transpondor may be readily ascertained.

There is also applied to the vertical deflecting electrodes V of tube 32 a scanning potential of saw-tooth wave form generated by the scanning-signal generator 33, the operation of which is synchronized by the signal generated by the generator 11. The periodicity of this scanning potential is thus the same as that of the signal of generator 11, but the duration of the saw-tooth component during each cycle thereof generally is much shorter than the period of the scanning potential and has a value dependent upon the desired maximum distance range of operation of the communication system. The scanning signal applied to the vertical deflecting electrodes V of tube 32 produces a vertical scanning movement of the electron beam of this tube while the modulation components applied to the horizontal deflecting electrodes produce a horizontal deflection of the beam, thereby to provide the desired indication.

An illustrative indication provided by the cathode-ray tube 32 is shown in Fig. 2 wherein it is assumed that the initiation of each vertical trace is near the bottom margin of the fluorescent screen. The first reply pulse P occurs a distance $d$ from the initiation of the vertical trace and is positioned asymmetrically with relation to the trace. The pulse P thus provides an indication that the replying transpondor is positioned a distance $d$ in miles from the interrogator-responser unit and, further, that it lies to one side of the plane of symmetry of the directional characteristics of the antenna systems 27 and 28 of the responser. There is also shown in Fig. 3 a pair of reply pulses P′ positioned a distance $d_1$ from the initiation of the vertical trace and symmetrical with respect thereto. This indicates that a second replying transpondor is located a distance $d_1$ in miles from the interrogator-responser and lies directly ahead of the antenna systems 27 and 28, the grouping of a relatively long pulse followed by a relatively short pulse being used for purposes of example as indicative of aircraft identity or its direction of flight. In practice, it is preferable that the frequency of the wave signal of the generator 15 be different from that of the generator 24. This avoids operation of the receivers 30 and 17 upon wave-signal energy reflected from such fixed or mobile objects as are capable of reflecting wave-signal energy.

It is also preferable that the altimeter 13 of the interrogator 10 and the altimeter 21 of the transpondor 19 be adjusted and sealed at the factory to read absolute height above sea level at normal barometric pressure. This ensures that all aircraft react identically and thus aircraft flying at the same height on a given day will be similarly altitude-coded regardless of prevailing barometric conditions.

It will be apparent from the foregoing description of the Fig. 1 system that the altimeter 13 and paired-pulse generator 12 of the interrogator 10 and the altimeter 21 and decoder 20 of the transpondor 19 individually comprise means included in the station carried by the mobile object for causing the transpondor 19 automatically and additionally to effect translation and utilization of the signal derived by the receiver 17 when the selectable zone of the interrogator 10 is contiguous to the traffic zone of the transpondor 19 and the object approaches the boundary between the last-mentioned zones.

The circuit arrangement of the paired-pulse generator 12 of the interrogator 10 may be as shown in Fig. 3 wherein elements corresponding to similar elements of Fig. 1 are identified by similar reference numerals. An output circuit of the pulse generator 11 is coupled through a condenser 36 to an inductor 37 which is coupled by a condenser 38 between the control electrode and cathode of a gaseous-discharge tube 39. This tube is normally nonconductive by virtue of a negative bias applied from a source B through a resistor R to its control electrode. The inductor 37 has selectively connected across it, by operation of one or more of a plurality of relays 40–43, inclusive, a selectable one of a plurality of condensers 44–49, inclusive. Each such condenser tunes the inductor 37 to an individual resonant frequency. The operating windings of the relays 40–43, inclusive, are connected to an individual one of a plurality of switch contacts 50–53, inclusive, of a switch 54. The latter includes a movable contact 55 which has a width sufficient to engage any two consecutive stationary contacts and is mechanically connected to the altimeter 13, shown as of the barometer type, for movement thereby. The contact 55 of the switch 54 is connected through a stationary contact 56 of a manually operable switch 57 to a battery 58 which provides a source of energization for the relays 40–43, inclusive.

The operating windings of the latter are also coupled to individual ones of a plurality of stationary contacts 50'–53', inclusive, of a manually operable switch 54', the movable contact 55' of which is coupled through a stationary contact 59 of the manually operable switch 57 to the battery 58. The relays 40–43, inclusive, are of similar construction and each has three single-pole double-throw relay switch elements. These elements for the relay 40 are designated $40_a$, $40_b$, and $40_c$. Corresponding switch elements for the other relays are designated by the relay identification number with the corresponding subscripts $a$, $b$ and $c$. In Fig. 3, the switch elements of relays 41, 42 and 43 are shown in their de-energized position while those of relay 40 are shown in energized position for purposes of illustration. The circuit connections between the several stationary switch contacts and movable switch elements of the several relays are shown in the drawing and therefore will not be described in detail. It will be understood that for purposes of simplicity only four relays are here shown, but that in actual practice a larger number of such relays will ordinarily be used, such relays having operating windings connected to individual ones of the stationary switch contacts of the switches 54 and 54' and having stationary switch contacts and movable switch elements interconnected in the manner shown in connection with the relays 40–43, inclusive.

The gaseous-discharge tube 39 has an anode coupled through an inductor 60 to a source of energization, indicated as +B, and also coupled to an input circuit of a delay line 61. The latter is of conventional construction and has a plurality of series inductors 62 capacitively coupled by condensers 63 through a resistor 64 to the cathode of the discharge device 39. The resistor 64 is coupled to an input circuit of a pulse-shaping and combining amplifier 65 which also has an input circuit coupled to an output circuit of the pulse generator 11.

Considering now the operation of the paired-pulse generator just described, assume as an initial condition that the manually operable switch 57 is operated to close its contact 56 and that the contact 55 of the switch 54 engages only the stationary contact 50 thereof. Relay 40 is thereupon energized from the battery 58 and actuates its switch elements $40_a$, $40_b$ and $40_c$ to their energized positions. This causes the condenser 44 to be coupled across the inductor 37, this circuit being traced through the switch element $41_a$ and the switch element $40_b$. The condenser 44 and inductor 37 then provide a resonant circuit which is shock-excited by each pulse of the generator 11. The polarity of the applied pulses is such that the first half-cycle of the shock-excited oscillations is a negative half-cycle, the second half-cycle being positive. The peak portion of this positive half-cycle has sufficient amplitude that it overcomes the negative bias of the source B and biases the gas-discharge tube 39 to its conductive state. Tube 39 thereupon rapidly discharges the delay line 61 which was previously charged from the source of positive potential +B through the inductor 60. This discharge of the delay line 61 produces a potential pulse across the resistor 64 which is applied to the input circuit of the unit 65. The same pulse which shock-excited the inductor 37 and its parallel-connected condenser 44 is also applied to unit 65. This pulse and that developed across the resistor 64 are combined in unit 65, after some wave-form shaping of the latter pulse by unit 65, and are applied as a paired-pulse signal to the output circuit of this unit. The frequency of the resonant circuit comprising the condenser 44 and inductor 37 is so selected, by selection of the capacitance of the condenser 44, that the first positive half-cycle of the shock-excited oscillations developed in the resonant circuit occurs a sufficient time after the exciting pulse applied thereto from the generator 11 that the paired pulses developed in the output circuit of unit 65 have a spacing between the leading edges thereof correctly to identify the lowest-altitude traffic zone.

As the interrogator is carried by the aircraft to the vicinity of the boundary between the lowest traffic zone and the contiguous zone just above it, the altimeter 13 moves the switch contact 55 of the switch 54 to close both of the stationary contacts 50 and 51. This additionally energizes the relay 41 which thereupon actuates its switch element $41_a$ to disconnect the condenser 44 from the inductor 37 and to connect the condenser 45 across the latter. The resonant frequency of the resonant circuit is then changed sufficiently that the paired pulses developed in the output circuit of unit 65 have a slightly larger spacing sufficient to interrogate transpondors in both the lowest zone and the contiguous zone just above it.

As the interrogator is carried well into the second zone, the movable contact 55 of the switch 54 is moved by the barometer 13 out of engagement with the switch contact 50, thereby to de-energize the relay 40. Movement of the switch element $40_b$ disconnects the condenser 45 from the inductor 37, but the switch element $40_c$ in de-energized position connects the condenser 46 across the inductor 47, this circuit being traced from the inductor 37 through the energized switch element $41_b$, through the de-energized switch element $40_c$, and through the de-energized switch element $42_a$ of the deenergized relay 42. The resonant frequency of the inductor 37 and condenser 46 is now such that the paired pulses developed in the output circuit of unit 65 have a spacing corresponding to the identification of the second altitude zone.

The operation of the relays to connect the several condensers individually and in turn across the inductor 37, thereby to establish corresponding spacings between the paired pulses of the signal generated by unit 65, continuous under control of the altimeter 13 in the manner described as long as the interrogator is carried to higher traffic zones. It will be apparent that the condensers are connected in similar manner to the inductor 37 but in a reverse order as the interrogator is carried from a higher zone toward a lower zone.

Upon manual movement of the switch 57 to close its contact 59, the movable contact 55' of the switch 54' may be manually moved to select and energize any relay desired, thereby to establish a paired-pulse spacing corresponding to the identification of any traffic zone which it is desired to interrogate. In this manner, the pilot is enabled manually to explore the traffic density at any altitude zone either above or below him. Having decided to move to a new zone, the pilot may manually explore his own zone and each zone as he approaches it, or he may manually move the switch 57 to close its contact 56 thus restoring the control of the paired-pulse generator to the altimeter 13 for automatic operation.

The circuit arrangement of the decoder 20 of the transpondor 19 of the Fig. 1 arrangement may be as shown in Fig. 4, wherein elements corresponding to similar elements of Fig. 1 are identified by similar reference numerals. The decoder includes a vacuum-tube repeater 70 having a first control electrode 71 normally biased, through a resistor 72 from a source of negative potential 73, to anode-current cutoff. This control electrode is coupled through a condenser 74 to the output circuit of the receiver 17 and is also coupled to the input circuit of a delay line 75. The output circuit of the delay line is coupled to an input circuit of an amplifier and wave shaper 76. The output circuit of the latter unit is coupled to the input circuit of a second delay line 77 which is terminated by a resistor 78 having a value of resistance equal to the characteristic impedance of the delay line 77. Tap points $d-i$, inclusive, equally spaced along the delay lines 75 and 77 are coupled through isolating resistors 79 to a stationary contact of an individual one of a plurality of respective relays 81–86, inclusive. The operating windings of these relays are connected in order to individual ones of the stationary contacts of a switch 87 which has a movable contact 88 mechanically connected to the altimeter 21 for movement thereby. The movable contact 88 has a width sufficient to engage any two consecutive stationary contacts. A source 92 is connected to the movable contact 88 to provide a source of energization for the operating windings of the relays 81–86, inclusive. The movable switch elements of the relays 81–86, inclusive, are connected in common to a second control electrode 89 provided in the vacuum tube 70. This control electrode is normally biased, through a resistor 90 from a source of negative bias potential 91, to anode-current cutoff. The output circuit of the repeater 70 is coupled to the reply-signal generator 22 as indicated.

Considering now the operation of the decoder just described, assume at the outset that the altimeter 21 has moved the movable contact 88 of the switch 87 to close its first contact, thereby to energize the relay 81. This assumed condition is that prevailing when the transpondor is in the lowest altitude zone. Energization of the relay 81 couples the point $d$ of the delay line 75 through an isolating resistor 79 to the control electrode 89 of the repeater 70. The signal of paired-pulse wave form derived in the output circuit of the receiver 17 is thus applied to the control electrode 71 of the vacuum tube 70 and to the input circuit of the delay line 75. The first pulse of this signal does not cause the vacuum tube 70 to become conductive since the latter is maintained in its nonconductive state by the bias applied from the source 91 to the control electrode 89. This first pulse, however, travels down the delay line 75 and reaches the point $d$ thereof after a short time interval at which moment it is applied through an isolating resistor 79 to the second control electrode 89 of the vacuum tube 70. Should the second pulse of the applied signal now occur at this moment, both of the control electrodes 71 and 89 of the vacuum tube 70 are biased above anode-current cutoff so that the second pulse is repeated to the output circuit of the tube 70 and thus is applied to the reply-signal generator 22. When this occurs, the spacing between the paired pulses of the applied signal corresponds to the identification of the traffic zone then used by the aircraft which carries the transpondor, and a reply wave signal is transmitted by the transpondor as earlier described. If the second pulse applied to the control electrode 71 of the tube 70 had not coincided in point of time with the delayed pulse applied to its control electrode 89, neither the second pulse or the delayed pulse would have rendered the tube 70 conductive since this condition can only occur when both control electrodes are simultaneously biased above anode-current cutoff. In such event, however, the applied signal would have a paired-pulse spacing corresponding to the identification of a traffic zone other than that in which the transpondor was then carried and no reply wave signal of the transpondor would be desired.

Should the transpondor now be carried to the vicinity of the boundary of the next higher contiguous traffic zone, the movable contact 88 of the switch 87 would be actuated by the altimeter 21 to close both the first and second contacts, thereby to energize the relay 82 simultaneously with the relay 81. The result of this is to cause the application to the control electrode 89 of two successive pulses, one having a delay corresponding to that of the point $d$ of the delay line 75, and the other pulse having a delay corresponding to that of the point $e$ of this line. If now the second pulse of the applied paired-pulse signal coincides in time with either of these pulses applied to the control electrode 89, it will be apparent from the foregoing described operation that this pulse is repeated to the output circuit of the tube 70 to cause a reply by the transpondor. The transpondor would thus reply to interrogating signals both in its own zone and in the contiguous zone above it. As the transpondor moves well into the contiguous zone, the relay 81 is eventually de-energized so that the transpondor then replies only to interrogation in the one zone in which it is then carried. The relays 81–86, inclusive, are energized in order under control of the altimeter 21 as the transpondor is carried to higher zones, and are energized in reverse order as the transpondor is carried from a higher to a lower zone.

As is well known, a pulse translated through a delay line has its wave form unduly degraded if the delay line is too long. It is the purpose of the amplifier and wave shaper 76 to restore to a pulse translated through the entire delay line 75 its original wave form and amplitude after which the re-shaped pulse is applied to the delay line 77 to be further delayed as desired. While only one such unit 76 is shown, it will be apparent that a plurality of similar delay lines coupled by intervening amplifier and wave shaping units may be employed where very long time delays are desired in the operation of the communication system.

From the foregoing description of the decoder, it will be apparent that the altimeter 21, which may be a barometer, comprises an altitude-responsive device for providing a control action varying with the progressive vertical movement of the device 21 through vertically separated traffic zones. It will further be apparent that the repeater 70 comprises means controlled by the control action of this device for translating and utilizing signal energy, derived by the receiver 17 and applied to the repeater 70, when the variable wave-form portions thereof have a relative amount of variation corresponding to the identification of the vertically separated traffic zone then used by the aircraft which carries the transpondor.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A system for signaling between two wave-signal stations, at least one of which is carried by a mobile object using any of a plurality of relatively fixed and identified traffic zones available to mobile objects, comprising: means at one of said stations for transmitting a wave signal modulated by a signal having a characteristic identifying by the variation thereof a selectable one of said traffic zones; means at the other of said stations for receiving said wave signal and for translating and utilizing a signal derived in response thereto; means for determining correspondence between a characteristic of said derived signal and the characteristic of the signal of a traffic zone to which said receiving means is selectively responsive; means included in the station carried by said object for causing the one of said means at said last-mentioned station automatically and additionally to effect translation and utilization of said derived signal by said receiving means; and means for determining contiguity between a selectable zone of said first-named means and said traffic zone of said receiving means as said object is in the vicinity of the boundary between said last-mentioned zones.

2. A system for signaling between two wave-signal stations, at least one of which is carried by a mobile object using any of a plurality of relatively fixed and identified traffic zones available to mobile objects, comprising: means at one of said stations for transmitting a wave signal modulated by signal energy of pulse wave form having at least two relatively variable wave-form portions identifying by their relative amount of variation a selectable one of said traffic zones; means at the other of said stations for receiving said wave-signal energy and for translating and utilizing signal energy derived in response thereto and having corresponding variable wave-form portions; means for determining correspondence between the relative amounts of variation of the variable wave-form portions of said derived signal energy and the characteristic variation of the wave form of a traffic zone to which said receiving means is selectively responsive; means included in the station carried by said object for causing the one of said means at said last-mentioned station automatically and additionally to effect translation and utilization of said derived signal energy by said receiving means; and means for determining contiguity between a selectable zone of said first-named means and said traffic zone of said receiving means as said object is in the vicinity of the boundary between said last-mentioned zones.

3. A system for signaling between two wave-signal stations, at least one of which is carried by a mobile object using any of a plurality of relatively fixed and identified traffic zones available to mobile objects, comprising: means at one of said stations for transmitting a wave signal modulated by signal energy of pulse wave form having repeated pairs of pulses with at least two relatively variable wave-form portions of each pair thereof identifying by their relative amount of variation a selectable one of said traffic zones; means at the other of said stations for receiving said wave-signal energy and for deriving in response thereto signal energy of cyclic wave form having during each cycle thereof two relatively variable wave-form portions varying with those of said each pair of repeated pulses of said modulation-signal energy; means at said other station for translating and utilizing said derived signal energy; means for determining correspondence between the relative amounts of variation of the variable wave-form portions of said derived signal energy and the characteristic variation of the wave form of a traffic zone to which said translating means is selectively responsive; means included in the station carried by said object for causing said translating means automatically and additionally to effect translation and utilization of said derived signal energy; and means for determining contiguity between a selectable zone of said first-named means and said traffic zone of said translating means as said object is in the vicinity of the boundary between said last-mentioned zones.

4. A system for signaling between two wave-signal stations, at least one of which is carried by a mobile object using any of a plurality of relatively fixed and identified traffic zones available to mobile objects, comprising: means at one of said stations for transmitting a wave signal modulated by signal energy of pulse wave form having the leading edges of two successive pulses thereof variably spaced to identify by their relative spacing a selectable one of said traffic zones; means at the other of said stations for receiving said wave signal and for deriving in response thereto signal energy having a pulse wave form corresponding to that of said modulation signal energy and including said variable spacing between the leading edges of two successive pulses thereof; means at said other station for translating and utilizing said derived signal energy including means for determining correspondence between the relative spacing of the leading edges of said two successive pulses and the characteristic pulse spacing of the wave signal which identifies a traffic zone to which said translating means is selectively responsive; and means included in the station carried by said object for causing said translating means automatically and additionally to effect translation and utilization of said derived signal energy for determining contiguity between a selectable zone of said first-named means and said traffic zone of said translating means as said object is in the vicinity of the boundary between said last-mentioned zones.

5. A system for signaling between two wave-signal stations, at least one of which is carried by a mobile object using any of a plurality of relatively fixed and identified traffic zones available to mobile objects, comprising: means at the one of said stations carried by said object for transmitting a wave signal modulated by a signal having a characteristic identifying by the variation thereof a selectable one of said traffic zones used by said object; means also at the one of said stations carried by said object, operationally coupled to said transmitting means, for causing said transmitting means additionally and simultaneously to transmit on said modulated wave signal a signal identifying a traffic zone mobile object is in the vicinity of said contiguous zone means at the other of said stations for receiving said wave signal and for translating and utilizing a signal derived in response thereto;

and means for determining correspondence between a characteristic of said derived signal and the characteristic of the signal of a traffic zone to which said receiving means is selectively responsive.

6. A system for signaling between two wave-signal stations, at least one of which is carried by a mobile object using any of a plurality of relatively fixed and identified traffic zones available to mobile objects, comprising: means at one of said stations for transmitting a wave signal modulated by a signal having a characteristic identifying by the variation thereof a selectable one of said traffic zones; means at the one of said stations carried by said object for receiving said wave signal and for translating and utilizing signal energy derived in response thereto; means for determining correspondence between a characteristic of said derived signal and the characteristic of the signal of a traffic zone at that time in use by said object; means included in the station carried by said object for causing said receiving means automatically and additionally to effect translation and utilization of said derived signal by said receiving means; and means for determining contiguity between a selectable zone of said first-named means and said traffic zone used by said object as said object is in the vicinity of the boundary between said last-mentioned zones.

7. A system for signaling between two mobile objects, using any of a plurality of identified traffic zones available to mobile objects, comprising: means carried by one of said objects for transmitting wave-signal energy modulated by signal energy of pulse wave form having at least two relatively variable wave-form portions normally identifying by their relative amount of variation the one of said traffic zones used by said one object; means also carried by said one object, operationally coupled to said transmitting means, for causing said transmitting means additionally and simultaneously to transmit on said modulated wave signal other signal energy similar to said first-mentioned signal energy identifying a traffic zone contiguous to said one zone when said one object is in the vicinity of said contiguous zone; means carried by the other of said objects for receiving said wave-signal energy and for translating and utilizing signal energy derived in response thereto; and means for determining correspondence between the relative amounts of variation of the variable wave-form portions of said derived signal energy and the characteristic variation of the wave form of the traffic zone then used by said other object.

8. A system for signaling between two mobile objects, using any of a plurality of vertically separated identified traffic zones available to mobile objects, comprising: means carried by one of said objects for transmitting wave-signal energy modulated by signal energy of pulse wave form having at least two relatively variable wave-form portions normally identifying by their relative amount of variation the one of said vertically separated traffic zones used by said one object but adapted additionally and simultaneously to identify a vertically separated traffic zone contiguous to said one zone when said contiguous zone is approached by said one object; means carried by the other of said objects for receiving said wave-signal energy and for deriving in response thereto signal energy having two relatively variable wave-form portions varying with those of said modulation-signal energy; an altitude-responsive device at said other object for providing a control action varying with the progressive vertical movement of said device through successive ones of said vertically separated traffic zones; means controlled by said control action for translating and utilizing said derived signal energy; and means for determining correspondence between the relative amounts of variation of the variable wave-form portions of said derived signal energy and the characteristic variation of the wave form of the vertically separated traffic zone then used by said other object.

9. A system for signaling between two mobile objects, using any of a plurality of vertically separated identified traffic zones available to mobile objects, comprising: means carried by one of said objects for providing a control action automatically varying with vertical distance from a traffic-zone reference level; means at said one object and including said first-mentioned means for transmitting wave-signal energy modulated by signal energy of pulse wave form having under control of said first-mentioned means at least two relatively variable wave-form portions normally automatically identifying by their relative amount of variation the one of said vertically separated traffic zones used by said one object but adapted additionally and simultaneously to identify a traffic zone contiguous to said one zone when said contiguous zone is approached by said one object; means carried by the other of said objects for receiving said modulated wave-signal energy and for deriving in response thereto signal energy having two relatively variable wave-form portions varying with those of said modulation-signal energy; means at said other object for providing a control action varying with vertical distance from said traffic-zone reference level; means controlled by said control action of said last-mentioned means for translating and utilizing said derived signal energy; and means for determining correspondence between the relative amounts of variation of the variable wave-form portions of said derived signal energy and the characteristic variation of the wave form of the vertically separated traffic zone then used by said other object.

10. A system for signaling between two mobile objects, using any of a plurality of vertically separated identified traffic zones available to mobile objects, comprising: a first barometer carried by one of said objects for providing a control action varying with barometric pressure; means at said one object and including said first barometer for transmitting wave-signal energy modulated by signal energy of pulse wave form having under control of said barometer at least two relatively variable wave-form portions automatically identifying by their relative amount of variation the one of said vertically separated traffic zones used by said one object but adapted additionally and simultaneously to identify a vertically separated traffic zone contiguous to said one zone when said contiguous zone is approached by said one object; means carried by the other of said objects for receiving said modulated wave-signal energy and for deriving in response thereto signal energy having two relatively variable wave-form portions varying with those of said modulation-signal energy; a second barometer at said other object for providing a control action varying with barometric pressure; means controlled by said control action of said second barometer for translating and utilizing said derived signal energy; and means for determining correspondence between the relative amounts of variation of the variable wave-form portions of said derived signal energy and the characteristic variation of the wave form of the vertically separated traffic zone then used by said other object, whereby translation and utilization of said derived signal energy occurs during intevals when said other object is using any traffic zone identified by said modulation signal.

11. A system for signaling between two mobile objects, using any of a plurality of identified traffic zones available to mobile objects, comprising: means carried by one of said objects for transmitting wave-signal energy modulated by signal energy of pulse wave form having at least two relatively variable wave-form portions identifying by their relative amount of variation the one of said traffic zones used by said one object; means carried by tne other of said objects for receiving said wave-signal energy and for deriving in response thereto signal energy of pulse wave form corresponding to said modulation-signal energy and including said two variable waveform portions; means carried by said other object for normally translating and utilizing said derived signal energy; means for determining correspondence between the relative amounts of variation of the variable wave-form portions of said derived signal energy and the characteristic variation of the wave form of the traffic zone then used by said other object; means responsive to the movement of said other object to a position in the vicinity of the boundary between said then-used traffic zone and a traffic zone contiguous thereto for causing said last-mentioned means automatically, additionally and simultaneously to effect translation and utilization thereby of said derived signal energy; and means for determining correspondence between the amount of variation of said derived signal and the signal of said contiguous traffic zone.

12. In a system for signaling between two wave-signal stations, at least one of which is carried by a mobile object using any of a plurality of relatively fixed and identified traffic zones available to mobile objects, a wave-signal receiver at said one station comprising: means for receiving a wave signal which is transmitted by the other of said stations and is modulated by a signal having a characteristic identifying by the variation thereof a selectable one of said traffic zones; means responsive to said received wave signal for deriving a signal having a characteristic varying with that of said modulation signal; means for translating and utilizing said derived signal; means for determining correspondence between a characteristic of said derived signal and the characteristic of the signal of a traffic zone at that time in use by said object; means for causing the translation and utilization of said derived signal by said last-mentioned means; and means for determining contiguity between a selectable zone of said first-named means and said traffic zone used by said object as said object is in the vicinity of the boundary between said last-mentioned zones.

13. In a system for signaling between two wave-signal stations, at least one of which is carried by a mobile object using any of a plurality of relatively fixed and identified traffic zones available to mobile objects, a wave-signal receiver at said one station comprising: means for receiving a wave signal which is transmitted by the other of said stations and is modulated by signal energy of pulse wave form having the leading edges of two successive pulses thereof variably spaced to designate by their relative spacing a selectable one of said traffic zones; means responsive to said received wave signal for deriving signal energy having a pulse wave form corresponding to that of said modulation-signal energy and including said variable spacing between the leading edges of two successive pulses thereof; means for translating and utilizing said derived signal energy including means for determining correspondence between the relative spacing of the leading edges of said two successive pulses and the characteristic pulse spacing of the wave signal which identifies a traffic zone at that time in use by said object; means for causing the translation and utilization of said derived signal by said last-mentioned means; and means for determining contiguity between a selectable zone of said first-named means and said traffic zone used by said object as said object is in the vicinity of the boundary between said last-mentioned zones.

14. In a system for signaling between two wave-signal stations, at least one of which is carried by a mobile object using any of a plurality of relatively fixed and identified vertically separated traffic zones available to mobile objects, a wave-signal receiver at said one station comprising: means for receiving a wave signal which is transmitted by the other of said stations and is modulated by a signal having a characteristic identifying by the variation thereof a selectable one of said traffic zones; means responsive to said received wave signal for deriving a signal having a characteristic varying with that of said modulation signal; means for translating and utilizing said derived signal; means for determining correspondence between a characteristic of said derived signal and the characteristic of the signal of a traffic zone at that time in use by said object; a barometer for providing a control action varying with barometric pressure; means controlled by said control action of said barometer for causing the translation and utilization of said derived signal by said translating means; and means for determining contiguity between a selectable zone of said first-named means and said traffic zone in use by said object as said object is in the vicinity of the boundary between said last mentioned zones.

15. In a system for signaling between two wave-signal stations, at least one of which is carried by a mobile object using any of a plurality of relatively fixed and identified traffic zones available to mobile objects, a wave-signal transmitter at said one station comprising: a signal source; means responsive to the signal of said source for deriving a modulation signal of pulse wave form having at least two relatively variable wave-form portions normally identifying by their relative amount of variation the one of said traffic zones used by said object; means operationally coupled to said responsive means for causing said responsive means additionally and simultaneously to derive another modulation signal similar to said first-mentioned modulation signal identifying a traffic zone contiguous to said one zone when said mobile object is in the vicinity of said contiguous zone; and means for transmitting wave-signal energy modulated by said modulation signal.

16. In a system for signaling between two wave-signal stations, at least one of which is carried by a mobile object using any of a plurality of relatively fixed and identified traffic zones available to mobile objects, a wave-signal transmitter at said one station comprising: a signal source; means responsive to the signal of said source for deriving a modulation signal of pulse wave form having the leading edges of two successive pulses thereof variably spaced normally to identify by their relative amount of spacing the one of said traffic zones used by said object; means operationally coupled to said responsive means for causing said responsive means additionally and simultaneously to derive another modulation signal similar to said first-mentioned modulation signal identifying a traffic zone contiguous to said one zone when said mobile object is in the vicinity of said contiguous zone; and means for transmitting wave-signal energy modulated by said modulation signal.

17. In a system for signaling between two wave-signal stations, at least one of which is carried by a mobile object using any of a plurality of relatively fixed and identified vertically separated traffic zones available to mobile objects, a wave-signal transmitter at said one station comprising: a signal source; a barometer for providing a control action varying with barometric pressure; means controlled by said control action of said barometer and responsive to the signal of said source for deriving a modulation signal of pulse wave form having at least two relatively variable wave-form portions normally identifying by their relative amount of variation the one of said vertically separated traffic zones used by said object; means operationally coupled to said responsive means for causing said responsive means additionally and simultaneously to derive another modulation signal similar to said first-mentioned modulation signal identifying a traffic zone contiguous to said one zone when said mobile object is in the vicinity of said contiguous zone; and means for transmitting wave-signal energy modulated by said modulation signal.

ROBERT B. J. BRUNN.

REFERENCES CITED

The following references are of record in the file of this patent:

UNITED STATES PATENTS

| Number | Name | Date |
|---|---|---|
| 2,090,359 | Robinson | Aug. 17, 1937 |
| 2,132,599 | Baumann et al. | Oct. 11, 1938 |
| 2,266,401 | Reeves | Dec. 16, 1941 |
| 2,312,203 | Wallace | Feb. 23, 1943 |
| 2,321,698 | Nolde | June 15, 1943 |
| 2,378,604 | Wallace | June 19, 1945 |
| 2,403,600 | Holmes | July 9, 1946 |
| 2,403,603 | Korn | July 9, 1946 |
| 2,421,106 | Wight | May 27, 1947 |
| 2,424,984 | Hoffman | Aug. 5, 1947 |
| 2,429,607 | Capen | Oct. 28, 1947 |
| 2,430,292 | Hershberger | Nov. 4, 1947 |
| 2,433,341 | Busignies | Dec. 30, 1947 |
| 2,433,381 | Marchand | Dec. 30, 1947 |
| 2,444,445 | Isbister | July 6, 1948 |
| 2,448,016 | Busignies | Aug. 31, 1948 |
| 2,450,005 | Labin | Sept. 28, 1948 |